(12) United States Patent
Ziech et al.

(10) Patent No.: US 8,911,321 B2
(45) Date of Patent: Dec. 16, 2014

(54) TANDEM AXLE SYSTEM

(71) Applicant: Dana Heavy Vehicle Systems Group, LLC, Maumee, OH (US)

(72) Inventors: James F. Ziech, Kalamazoo, MI (US); Donald J. Remboski, Ann Arbor, MI (US); Richard A. Nellums, Maumee, OH (US); Benjamin J. Passino, Maumee, OH (US); Stephen C. Cochran, Sylvania, OH (US); Stephen A. Edelen, Battle Creek, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 13/973,166

(22) Filed: Aug. 22, 2013

(65) Prior Publication Data

US 2014/0057752 A1    Feb. 27, 2014

Related U.S. Application Data

(60) Provisional application No. 61/692,292, filed on Aug. 23, 2012.

(51) Int. Cl.
*F16H 48/06* (2006.01)
*B60K 17/16* (2006.01)
*B60K 17/36* (2006.01)

(52) U.S. Cl.
CPC ............... *B60K 17/16* (2013.01); *B60K 17/36* (2013.01)
USPC ............................................................ 475/221

(58) Field of Classification Search
None
See application file for complete search history.

(56) References Cited

U.S. PATENT DOCUMENTS

| | | | | |
|---|---|---|---|---|
| RE25,269 | E * | 10/1962 | Christie | 180/24.09 |
| 5,267,489 | A * | 12/1993 | Ziech | 74/606 R |
| 6,514,169 | B2 * | 2/2003 | Turner et al. | 475/222 |
| 7,258,644 | B2 * | 8/2007 | Ziech et al. | 475/221 |
| 7,306,536 | B2 * | 12/2007 | Ziech | 475/221 |
| 8,398,520 | B1 * | 3/2013 | Bassi et al. | 475/221 |
| 8,523,738 | B2 * | 9/2013 | Morscheck et al. | 477/77 |
| 8,651,994 | B2 * | 2/2014 | Bassi et al. | 475/221 |
| 2006/0272866 | A1 | 12/2006 | Ziech | |
| 2010/0248888 | A1 | 9/2010 | Hamperl et al. | |

FOREIGN PATENT DOCUMENTS

| | | |
|---|---|---|
| WO | 2008019779 A2 | 2/2008 |
| WO | 2008113484 A1 | 9/2008 |

* cited by examiner

*Primary Examiner* — Dirk Wright
(74) *Attorney, Agent, or Firm* — Marshall & Melhorn, LLC (57) ABSTRACT

A tandem axle system has a forward axle system and a rear axle system. A method of selectively driving one or both of the axle systems is described.

50 Claims, 7 Drawing Sheets

TANDEM AXLE SYSTEM

RELATED APPLICATIONS

This application claims benefit of and priority to U.S. Provisional Application Ser. No. 61/692,292 filed on Aug. 23, 2012 which is fully incorporated by reference herein.

BACKGROUND OF THE INVENTION

The typical North American class 8 truck rear tandem axle is a full time 6×4 driveline with an inter-axle differential lock and optional wheel differential lock(s). This system offers good traction in most conditions, but suffers from spin loss and gear mesh inefficiencies. Alternate 6×2 drive-line systems can improve the spin loss and gear loss efficiency, but these systems are limited on tractive effort due to the single drive axle. The 6×2 system can utilize a wheel differential lock and to shift weight to the drive axle under low traction conditions to improve tractive effort, but cannot equal the performance of the 6×4 system traction. What is needed is a tandem axle system that has the efficiency of a 6×2 tandem with the tractive effort of the 6×4 system.

SUMMARY OF THE INVENTION

Methods for driving tandem axle systems are described. Generally, the methods comprise providing a rotational input into the tandem axle system, which comprises a forward axle system and a rear axle system. The rotational input may be continuously provided to the forward axle system or the rear axle system. When the rotational input is provided continuously to the forward axle system, the rear axle system is selectively engaged and disengaged to control churning losses and increase the efficiency of the tandem axle system. When rotational input is provided continuously to the rear axle system, the forward axle system is selectively engaged and disengaged to control churning losses and increase the efficiency of the tandem axle system. Various embodiments of tandem axle systems are provided utilizing components to engage and disengage the forward or rear axle systems.

DETAILED DESCRIPTION OF THE PREFERRED EMBODIMENTS

Figure 1:
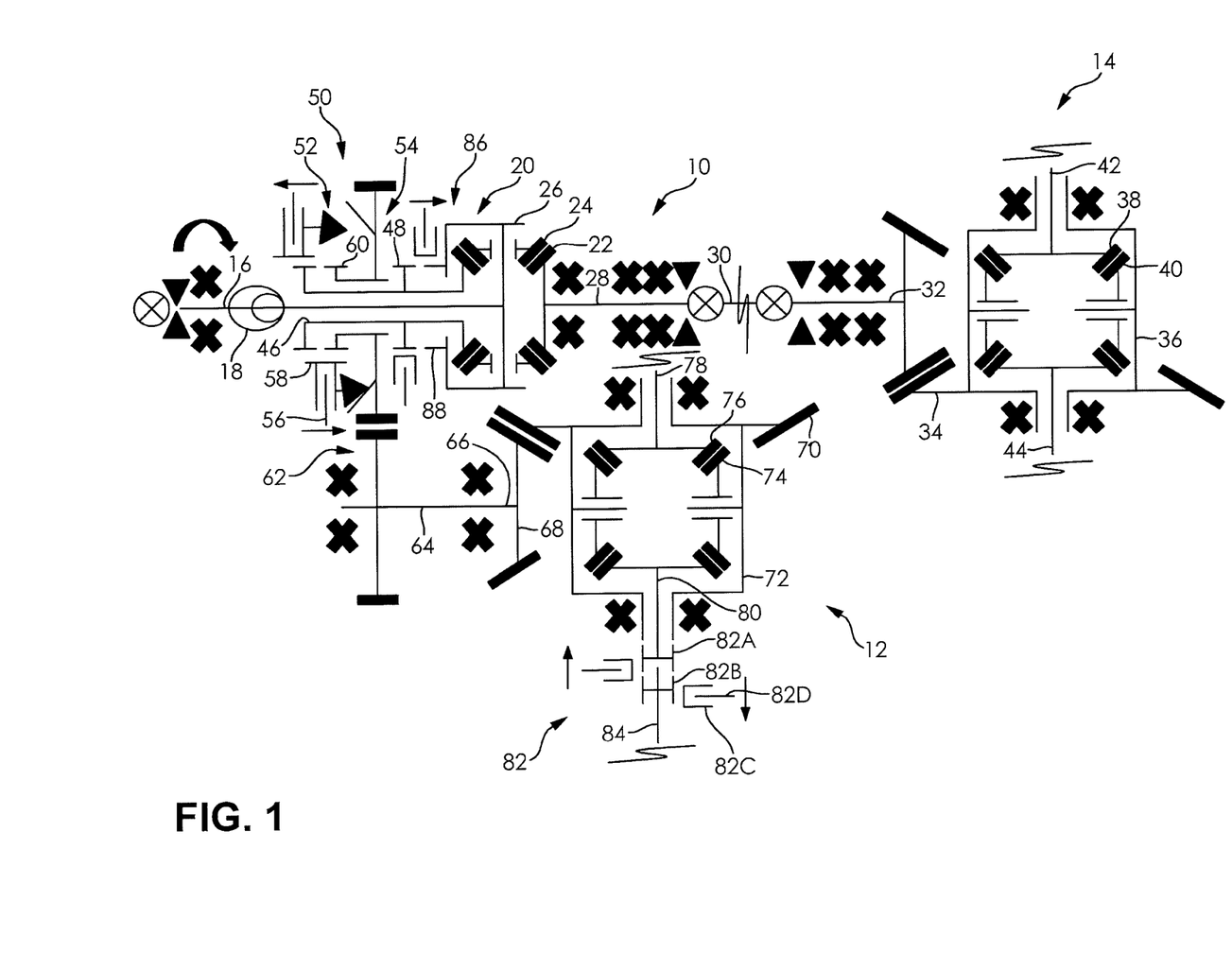
FIG. 1 is a schematic depiction of one embodiment of the tandem axle system.

Turning now to FIG. 1, one embodiment of a tandem axle system 10 is schematically depicted. The system 10 comprises of a forward axle system 12 and a rear axle system 14.

Rotational energy is provided to the tandem axle system 10 through an input shaft 16 that is rotated by an internal combustion engine (not shown).

A gerotor pump 18 is rotated by the input shaft 16. The gerotor pump 18 pumps lubricant to rotating parts in the forward axle system 12 regardless of the operating condition of the forward axle system 12, which can be selectively engaged and disengaged.

The input shaft 16 is connected to an interaxle differential (IAD) 20. The IAD 20 comprises at least two side gears 22 and at least two pinion gears 24, with the side gears 22 and pinion gears 24 being in driving engagement with one another. The side gears 22 and pinion gears 24 are located within an IAD carrier 26. The IAD 20 provides differential action between the forward axle system 12 and the rear axle system 14.

An output shaft 28 connected to one of the IAD side gears 22 is connected to a first end of a propeller shaft 30. The propeller shaft 30 extends between the forward axle system 12 and the rear axle system 14. A second end of the propeller shaft 30 is connected to a rear pinion gear 32. The rear pinion gear 32 is drivingly connected to a rear ring gear 34. The rear ring gear 34 is connected to a rear differential 36.

The rear differential 36 comprises at least two side gears 38 and at least two pinion gears 40 to permit differential rotation between the wheels (not shown) on a first axle shaft 42 and a second axle shaft 44 connected to the side gears 38.

A first concentric shaft 46 is provided about the input shaft 16. The first concentric shaft 46 is connected to one of the IAD side gears 22. The first concentric shaft 46 also carries a dog clutch gear 48.

A synchronizer system 50 is concentric with the first concentric shaft 46. The synchronizer system 50 comprises a cone assembly 52. The cone assembly 52 may be selectively moved in the axial direction into and out of engagement with a plate assembly 54 a portion of which is angled to receive the cone assembly 52.

The cone assembly 52 is rotatable and via the axial movement, it may be brought into selective engagement with the plate assembly 54. The rotation of the cone assembly 52 is imparted to the plate assembly 54, which causes the plate assembly 54 to rotate. As the cone assembly 52 is brought into additional engagement with the plate assembly 54, the plate assembly 54 is matched or substantially matched to the same rotational speed of the cone assembly 52.

At a predetermined time, such as when the rotational speed of the plate assembly 54 and cone assembly 52 are matched or substantially matched via substantial engagement of the plate and cone assemblies 52, 54, a shift fork 56 moves a dog clutch ring 58 on the dog clutch gear 48 also to a synchronizer gear 60. The dog clutch ring 58 rotationally connects the synchronizer gear 60 and the dog clutch gear 48.

While a synchronizer system is described above, dog clutches, friction plate clutches or an over-running clutches may be used instead of the synchronizer system.

The synchronizer system 50 is selectively connected to, and thus selectively rotates, a drop gear set 62. The drop gear set 62 is connected to an input shaft 64 of the forward axle system 12. The input shaft 64 is provided with, or connected to, a pinion shaft 66. The pinion shaft 66 has a pinion gear 68. The pinion gear 68 is connected to a differential ring gear 70. The ring gear 70 is connected to a differential carrier 72. At least two pinion gears 74 and at least two side gears 76 are located within the differential carrier 72.

Shafts extend into the differential carrier 72 and connect with the side gears 76. The shafts extend outboard the differential carrier 72. The shafts may be full length shafts or they may be stub shafts. First and second stub shafts 78, 80 are shown extending from the carrier 72.

A clutch 82, such as a dog-type clutch, may be located on the second stub shaft 80. The clutch 82 may selectively move along the stub shaft 80 for connecting and disconnecting the stub shaft 80 with an axle shaft 84 rotationally supporting at least one wheel and tire (not shown).

The clutch 82 may comprise a first set of splines or gears 82A that are selectively connected with a second set of splines or gears 82B via a clutch ring 82C. The clutch ring 82C selectively connects the gears 82A, 82B when moved by a shift fork 82D.

A selectively engagable clutch 86 may be provided at the interaxle differential 20 for locking the output shaft 28 to the input shaft 16. In the depicted embodiment, the first concentric shaft 46 is selectively connected to the IAD carrier 26 with the clutch 86. The IAD carrier 26 is provided with a set of teeth, a gear, or splines; teeth 88 will be used in the following description. The clutch 86, such as a dog-type clutch, is designed to selectively engage and disengage with the IAD housing teeth 88. The clutch 86 selectively joins the IAD carrier teeth 88 with a gear 90 on the concentric shaft 46.

Based on the foregoing, it can be appreciated that the tandem axle system 10 can be operated in different modes. Typically, the rear axle system 14 is engaged in the drive-line full time and the forward axle system 12 is engaged for only intermittent use, such as for startup and low speed traction conditions. The forward axle system 12 is disengaged and allowed to idle most of the time.

The tandem has three modes of operation: first, 6×2 with the forward axle system 12 disconnected; second, 6×4 with the IAD open with the forward and rear axle systems 12, 14 providing drive; and third, 6×4 with the IAD locked and the forward and rear axle systems 12, 14 providing drive.

In the first mode of operation, the synchronizer system 50 is not engaged so rotational power transfers from the engine to the rear axle system 14 through the locked IAD 20; no rotational power is transmitted to the forward axle system 12. Also, the clutch 86 between the stub shaft 80 and axle shaft 84 is unlocked so that the forward axle system 12 is not rotating, thus reducing, or preventing, oil churning losses.

In the second mode of operation, the synchronizer system 50 is engaged thus connecting both the forward and the rear axle systems 12, 14 to the engine. The IAD 20 is unlocked. In other words, the differential carrier 26 is not locked to the concentric shaft 46 with the interaxle differential clutch 86. Further, the fork 82D moves the ring 82C to connect the stub shaft 80 and the axle shaft 84 so that they rotate together.

In the third mode of operation, the clutches 82, 86 on the concentric shaft 46 and the stub shaft 80 of the axle shaft 84 of the forward axle system 12 are engaged. Thus, the forward axle system 12 provides rotational power to the forward wheels and tires. The IAD 20 is locked so that the forward and rear axle systems 12, 14 are driven at the same speed. In other words, the differential carrier 26 is locked to the concentric shaft 46 with the interaxle differential clutch 86. Further, the fork 82D moves the ring 82C to connect the stub shaft 80 and the axle shaft 84 so that they are rotate together.

Figure 2:
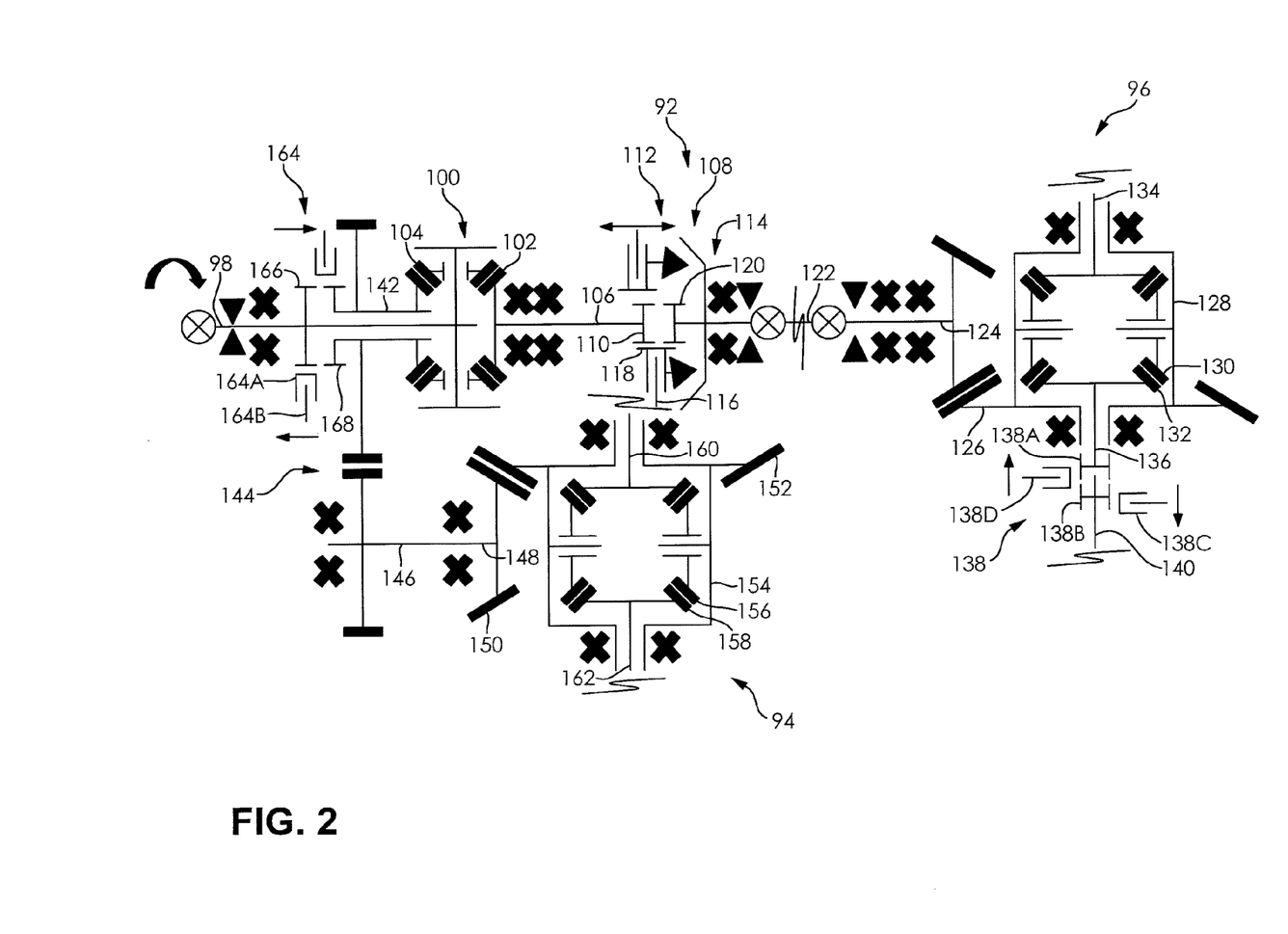
FIG. 2 is a schematic depiction of a second embodiment of the tandem axle system.

Turning now to FIG. 2, a second embodiment of a tandem axle system 92 is depicted. The system 92 comprises a forward axle system 94 and a rear axle system 96. An input shaft 98 is provided and rotated by an internal combustion engine (not shown). The shaft 98 is connected to an inter-axle differential (IAD) 100. The IAD 100 is comprised of at least two side gears 102 and at least two pinion gears 104. The side gears 102 and pinion gears 104 are meshed with one another.

An output shaft 106 is connected to one set of side gears 102. The output shaft 106 extends to a synchronizer system 108. The output shaft 106, or a gear 110 on the shaft 106, rotates the synchronizer system 108. The synchronizer system 108 comprises a cone assembly 112. The cone assembly 112, may be selectively moved in the axial direction into and out of engagement with a plate assembly 114 a portion of which is angled to receive the cone assembly 112.

The cone assembly 112 is rotatable by gear 110 and via the axial movement, it may be brought into selective engagement with the angled plate assembly 114. The rotation of the cone assembly 112 is imparted to the angled plate assembly 114, which causes the angled plate assembly 114 to rotate. As the cone assembly 112 is brought into additional engagement with the plate assembly 114, the plate assembly 114 is matched to the same rotational speed as the cone assembly 112.

At a predetermined time, such as when the rotational speeds of the plate and cone assemblies 112, 114 are matched, or substantially matched, a shift fork 116 moves a dog clutch ring 118 on the gear 110 also to a synchronizer gear 120.

The dog clutch ring 118 then rotationally connects the gear 110 and the synchronizer gear 120.

While a synchronizer system is described above, it can be appreciated that dog clutches, friction plate clutches or an over-running clutches may be used instead of the synchronizer system.

The plate assembly 114 is connected to a propeller shaft 122. The propeller shaft 122 extends to the rear axle system 96. The rear axle system 96 has a pinion shaft 124 rotated by the propeller shaft 122. The pinion shaft 124 rotationally drives a ring gear 126 mounted to a rear differential carrier 128. The rear differential carrier 128 houses at least two pinion gears 130 and at least two side gears 132.

Shafts extend into the rear differential carrier 128 and connect with the side gears 132. The shafts extend outboard the rear differential carrier 128. The shafts may be full length shafts or they may be stub shafts. First and second stub shafts 134, 136 are shown extending from the carrier 128.

A clutch 138, such as a dog-type clutch, may be located on the second stub shaft 136. The clutch 138 may selectively move along the second stub shaft 136 for connecting and disconnecting the second stub shaft 136 with an axle shaft 140 rotationally supporting at least one wheel and tire (not shown).

The clutch 138 may comprise a first set of splines or gears 138A that are selectively connected with a second set of splines or gears 138B via a clutch ring 138C. The clutch ring 138C selectively connects the gears 138A, 138B when moved by a shift fork 138D.

A shaft 142 concentric with the input shaft 98 is connected to one of the side gears 102 in the IAD 100. A drop gear set 144 is mounted on the concentric shaft 142.

The drop gear set 144 is connected to an input shaft 146 of the forward axle system 94. The input shaft 146 is provided with, or connected to, a pinion shaft 148. The pinion shaft 148 has a pinion gear 150. The pinion gear 150 is connected to a differential ring gear 152. The ring gear 152 is connected to a differential carrier 154. At least two pinion gears 156 and at least two side gears 158 are located within the differential carrier 154.

First and second shafts 160, 162 extend into the differential carrier 154 and connect with the side gears 158. The shafts 160, 162 extend outboard the differential carrier 154. The shafts 160, 162 may be full length shafts or they may be stub shafts. Regardless, at least one wheel and tire (not shown) are mounted on the shafts 160, 162.

A clutch 164 selectively connects the concentric shaft 142 to the input shaft 98. The clutch 164 may be such as a dog-type clutch, but other types of clutches are permissible. The clutch 164 selectively connects a gear 166 on the input shaft 98 with a gear 168, or splines, on the concentric shaft 142.

The clutch 164 comprises a clutch ring 164A that is selectively moved to join the gears 166, 168 by a shift fork 164B.

Based on the foregoing, it can be appreciated that the tandem axle system 92 can be operated in different modes. Typically, the forward axle system 94 is engaged in the drive-line full time and the rear axle system 96 is engaged for only intermittent use, such as for startup and low speed traction conditions. The rear axle system 96 is disengaged and allowed to idle most of the time.

The tandem axle system 92 has three modes of operation: first, 6×2 with the rear axle system 96 disconnected; second, 6×4 with the IAD 100 open with the front and rear axle systems 94, 96 connected; and third, 6×4 with the IAD 100 locked and the front and rear axle systems 94, 96 connected.

In the first mode of operation, the synchronizer system 108 is not engaged. Rotational power is therefore not transmitted to the rear axle system 96; only the forward axle system 94 receives rotational power. Also, the clutch 138 is unlocked so that the rear axle system 96 is not rotating, thus reducing oil churning losses. Clutch ring 164A connects the input shaft gear 166 with the concentric shaft 142 so that they rotate together.

In the second mode of operation, the synchronizer system 108 is engaged and rotational power is provided to both the forward axle system 94 and the rear axle system 96. The clutch 164 on the concentric shaft 142 is engaged with the input shaft 98 so that the stub shaft 136 rotates with the axle shaft 140.

In the third mode of operation, the synchronizer system 108 is engaged as described above. And the clutch 164 on the concentric shaft 142 is axially shifted so that it is locked with the input shaft 98 so that they rotate together, thus locking the IAD 100. Further, the clutch 164 on the rear axle stub shaft 136 is locked so that the stub shaft 136 and the outboard shaft 140 are connected.

Figure 3:
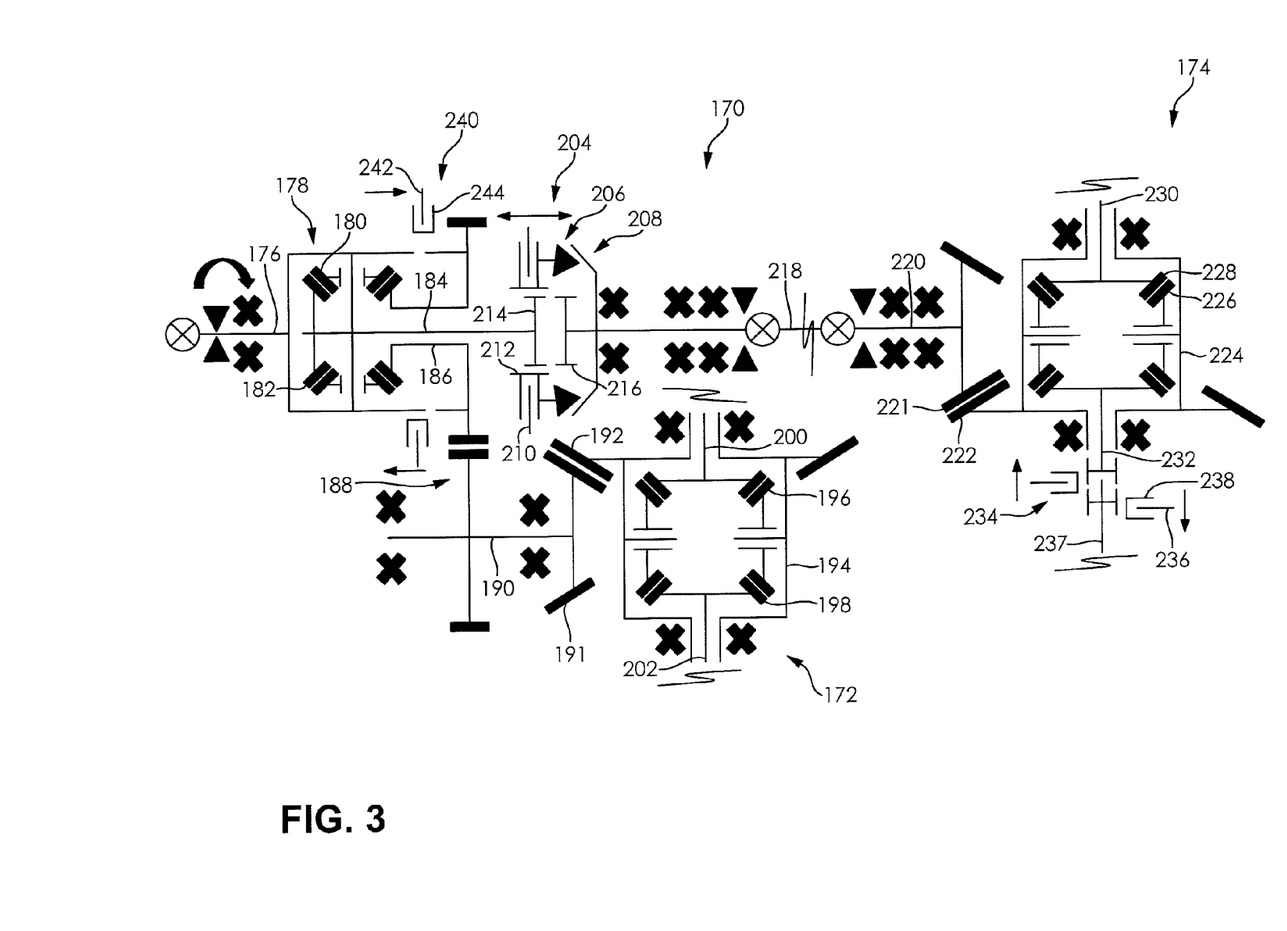
FIG. 3 is a schematic depiction of a third embodiment of the tandem axle system.

Turning now to FIG. 3, a third embodiment of a tandem axle system 170 is depicted. The system 170 comprises a forward axle system 172 and a rear axle system 174. An internal combustion engine (not shown) is connected to an input shaft 176 to impart rotational energy to the shaft 176. The shaft 176 is connected to an inter-axle differential (IAD) 178. The IAD 178 has at least two pinion 180 gears and at least two side gears 182 in engagement with one another. One set of side gears 182 is connected to an output shaft 184. The other set of side gears 182 is connected to a shaft 186 that is concentric with the output shaft 184.

The concentric shaft 186 is connected to a drop gear set 188. The drop gear set 188 connects the IAD 178 with the forward axle system 172. More particularly, the drop gear set 188 drives a pinion shaft 190. The pinion shaft 190 is drivingly connected to a ring gear 192. The ring gear is mounted to a differential carrier 194 and rotates the carrier 194. The differential carrier 194 houses at least two pinion gears 196 and at least two side gears 198.

First and second axle shafts 200, 202 are connected to the side gears 198 for rotation therewith. The axle shafts 200, 202 rotate the wheels and tires (not shown) located opposite the side gears to move the vehicle over the ground.

The IAD output shaft 184 is connected to a synchronizer system 204. The output shaft 184 rotates the synchronizer system 204. The synchronizer system 204 comprises a cone assembly 206. The cone assembly 206 may be selectively moved in the axial direction into and out of engagement with a plate assembly 208 that is angled to receive the cone assembly 206.

The rotation of the cone assembly 206 is imparted to the angled plate assembly 208, which causes the angled plate assembly 208 to rotate. As the cone assembly 206 is brought into additional engagement with the plate assembly 208, the plate assembly 208 rotates at the same rate as the cone assembly 206.

At a predetermined time, such as when the rotational speed of the plate assembly 208 and cone assembly 206 are matched or substantially matched, a shift fork 210 moves a dog clutch ring 212 on an output shaft gear 214 also to a synchronizer gear 216. The dog clutch ring 212 rotationally connects the gear 214 and the synchronizer gear 216.

While a synchronizer system 204 has been described above, it can be appreciated that dog clutches, friction plate clutches or an over-running clutches may be used instead of the synchronizer system 204.

The plate assembly 208 is connected to a propeller shaft 218. The propeller shaft 218 extends to the rear axle system 174. The rear axle system 174 has a pinion shaft 220 rotated by the propeller shaft 218. The pinion shaft 220 rotationally drives a ring gear 222 mounted to a rear differential carrier 224. The rear differential carrier 224 houses at least two pinion gears 226 and at least two side gears 228.

First and second shafts 230, 232 extend into the differential carrier 224 and connect with the side gears 228. The shafts extend outboard the differential carrier 224. The shafts 230, 232 may be full length shafts or they may be stub shafts. A stub shaft is shown for shaft 232.

A clutch 234, such as a dog-type clutch, may be located on the stub shaft 232. The clutch 234 comprises a shift fork 236 and a dog clutch ring 238. The dog clutch ring 238 may selectively connect the stub shaft 232 and an axle 237 rotationally supporting at least one wheel and tire.

Another clutch 240, which may be a dog-type clutch, may selectively connect the differential carrier 194 and the concentric shaft 186. The clutch 240 comprises a shift fork 242 and a dog clutch ring 244. The dog clutch ring 244 is adapted to move in a first axial direction to lock the carrier 194 and the concentric shaft 186 together and in a second axial direction, so that the carrier 194 and shaft 186 are not locked together and able to move independently from one another.

Based on the foregoing, it can be appreciated that the tandem axle system 170 can be operated in different modes.

In the present embodiment, the forward axle system 172 is engaged in the drive-line full time and the rear axle system 174 is engaged for only intermittent use, such as for startup and low speed traction conditions. The rear axle system 174 is disengaged and allowed to idle most of the time.

The tandem axle system 170 has three modes of operation: first, 6×2 with the rear axle system 174 disconnected; second, 6×4 with the inter-axle differential 178 open with the front and rear axle systems 172, 174 connected; and third, 6×4 with the inter-axle differential 178 locked and the front and rear axle systems 172, 174 connected.

In the first mode of operation, the synchronizer system 204 is open and rotational energy is directed exclusively to the forward axle system 172. No rotational energy is provided to the rear axle system 174, particularly when the dog clutch 234 is disengaged. More particularly, the shift fork 236 moves the collar 238 so that the stub shaft 232 is not engaged with the axle shaft 237. Thus, lubricant churning losses in the rear axle system 174 are minimized or prevented. Clutch ring 244 has engaged the differential carrier of the inter-axle differential 178 and the concentric shaft 186 so that they rotate together.

In the second mode of operation, the synchronizer system 204 is engaged and rotational energy is passed through the synchronizer system 204 to the rear axle system 174; rotational energy is also provided to the forward axle system 172. The clutch ring 244 has not engaged the differential carrier 178 with the concentric shaft 186 so they do not rotate together. The dog clutch 234 on the rear axle system 174 connects the stub shaft 232 with the axle shaft 237.

In the third mode of operation, the synchronizer system 204 is engaged and, in addition, the clutch 240 on the differential carrier 194 and the concentric shaft 186 is moved so that the differential carrier of the interaxle differential 178 and the concentric shaft 186 are locked together and rotate together. The dog clutch 234 on the rear axle system 174 connects the stub shaft 232 with the axle shaft 237.

Figure 4:
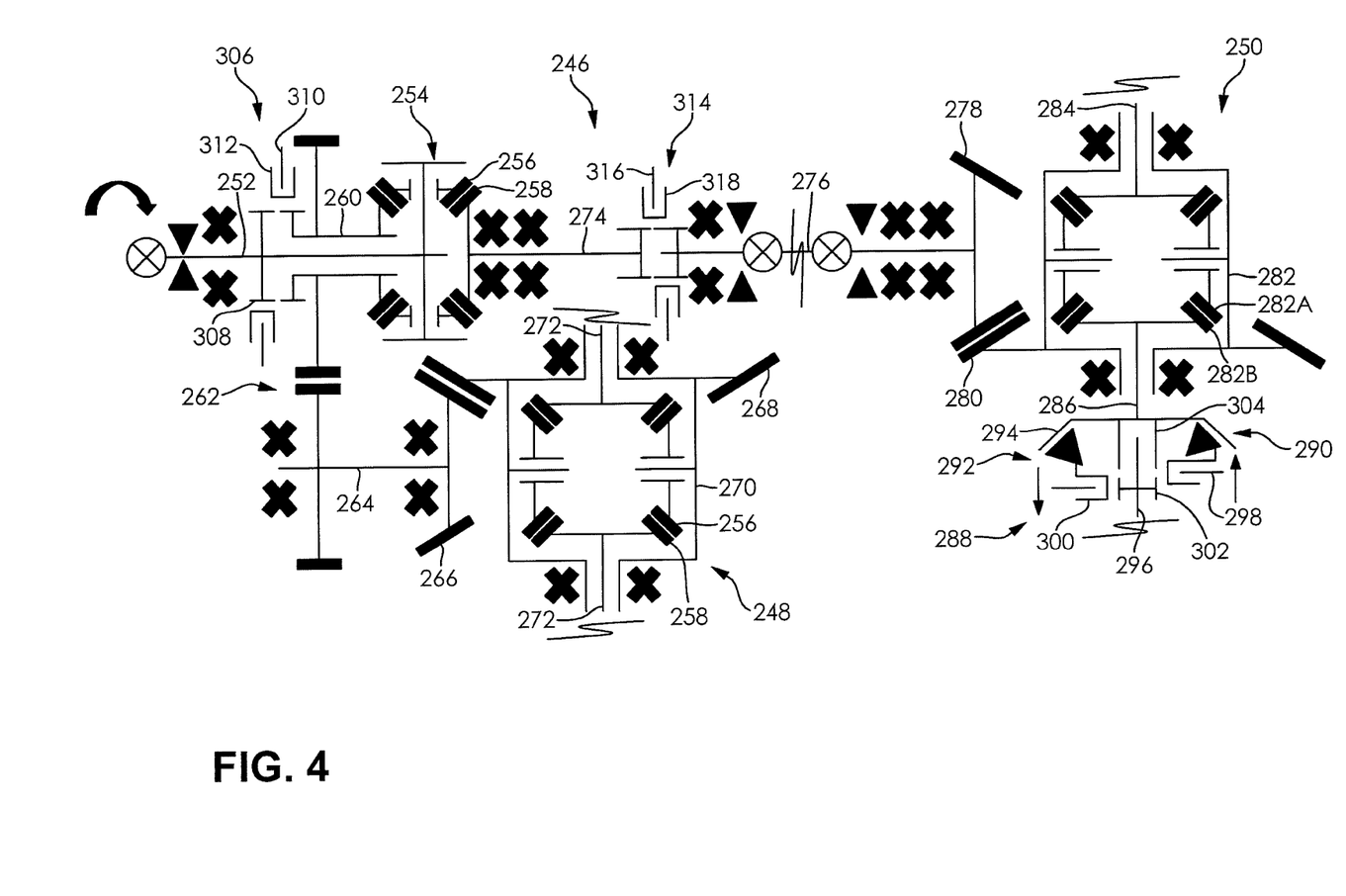
FIG. 4 is schematic depiction of a fourth embodiment of the tandem axle system.

Turning now to FIG. 4, another embodiment of a tandem axle system 246 is depicted. The system 246 comprises a forward axle system 248 and a rear axle system 250. The system 246 also comprises an input shaft 252 rotationally driven by an internal combustion engine (not shown). The input shaft 252 is connected to an inter-axle differential (IAD) 254. The IAD 254 has at least two pinion gears 256 and at least two side gears 258. One set of side gears 258 is connected to a shaft 260 that is concentric with the input shaft 252.

A drop gear set 262 is connected to the concentric shaft 260. The drop gear set 262 is connected to a pinion shaft 264 of the forward axle system 248. The pinion shaft 264 has a pinion gear 266. The pinion gear 266 is connected to a differential ring gear 268. The ring gear 268 is connected to a differential carrier 270. At least two pinion gears 256 and at least two side gears 258 are located within the differential carrier 270.

Shafts 272 extend into the differential carrier 270 and connect with the side gears 258. The shafts 272 extend outboard the differential carrier 270. The shafts 272 may be full length shafts or they may be stub shafts.

The other set of IAD side gears 258 is connected an output shaft 274. The output shaft 274 is connected to a propeller shaft 276. The propeller shaft 276 extends to the rear axle system 250. The rear axle system 250 has a pinion shaft 278 rotated by the propeller shaft 276. The pinion shaft 278 rotationally drives a ring gear 280 mounted to a rear differential carrier 282. The rear differential carrier 282 houses at least two pinion gears 282A and at least two side gears 282B.

First and second shafts 284, 286 extend into the differential carrier 282 and connect with the side gears 258. The shafts 284, 286 extend outboard the differential carrier 282. The shafts 284, 286 may be full length shafts or they may be stub shafts. A stub shaft 286 is depicted as extending from one side of the carrier 282.

A synchronizer system 288 is connected to the stub shaft 286. The stub shaft 286 rotates the synchronizer system 288. More particularly, the system 288 comprises a plate assembly 290 connected to the stub shaft 286; the plate assembly 290 rotates with the shaft 286.

The synchronizer system 288 also comprises a cone assembly 292. The cone assembly 292 may be selectively moved in the axial direction into and out of engagement with an angled plate 294 of the plate assembly 290 that is angled to receive the cone assembly 292.

The cone assembly 292 may be brought into selective engagement with the angled plate 294. The rotation of the cone assembly 292 is imparted to the angled plate 294, which causes the angled plate 294 to rotate. As the cone assembly 292 is brought into additional engagement with the plate 294, the two begin to rotate at the same rotational rate.

The cone assembly 292 is connected to a shaft 296 adjacent to the stub shaft 286. When the synchronizer system 288 is engaged the shaft 296 adjacent the stub shaft 286 is rotated.

At a predetermined time, such as when the rotational speed of the plate 294 and cone assembly 292 are matched or substantially matched, a shift fork 298 moves a dog clutch ring 300 on an axle shaft gear 302 also to a synchronizer gear 304. The dog clutch ring 300 rotationally connects the axle shaft gear 302 and the dog clutch gear 304. Outboard ends of the shaft or stub shaft support the wheels and tires (not shown) for the rear axle system 250.

Another clutch 306, which may be a dog-type clutch, may selectively connect the concentric shaft 260 and a gear 308 on the input shaft 252. The clutch 306 is adapted to move in a first axial direction to lock the concentric shaft 260 and the gear 308 together and in a second axial direction, which does not lock the concentric shaft 260 and gear 308 together. A shift fork 310 selectively moves a clutch ring 312 between the shaft 260 and the gear 308.

Another clutch 314, which also may be such as a dog-type clutch, may selectively connect the IAD output shaft 274 and the propeller shaft 276. This clutch 314 is also adapted to move in a first axial direction to lock the output shaft 274 and propeller shaft 276 together and in a second axial direction that does not lock the two shafts 274, 276 together. A shift fork 316 selectively moves a clutch ring 318 between the output shaft 274 and the propeller shaft 276.

Based on the foregoing, it can be appreciated that the tandem axle system 246 can be operated in different modes.

In the present embodiment, the forward axle system 248 is engaged in the drive-line full time and the rear axle system 250 is engaged for only intermittent use, such as for startup and low speed traction conditions. The rear axle system 250 is disengaged and allowed to idle most of the time to reduce, or prevent, lubricant churning losses.

The tandem has three modes of operation: first, 6×2 with the rear axle systems 250 disconnected; second, 6×4 with the IAD 254 open with the forward and rear axle systems 248, 250 connected; and third, 6×4 with the IAD locked and the forward and rear axle systems 248, 250 connected.

In the first mode of operation, the clutch 314 between the IAD 274 output shaft and the propeller shaft 276 is open and rotational energy is directed exclusively to the forward axle system 248. The synchronizer system 288 at the rear axle system 250 is open thus no rotational energy is provided to the rear axle system 250. The rear axle system 250 is not rotated and lubricant churning losses are prevented or minimized. More particularly, the fork 298 has moved the ring 300 so that it does not engage both the axle shaft 296 and synchronizer system 288. Clutch ring 312 has engaged both the concentric shaft 260 and the input shaft 252.

In the second mode of operation, the clutch 314 between the IAD output shaft 274 and the propeller shaft 276 is moved in the axial direction to close the connection between the two. Thus, rotational energy is passed through the clutch 314 to the rear axle system 250, and rotational energy is also provided to the forward axle system 248. The fork 298 has moved the ring 300 so that it engages both the axle shaft 296 and synchronizer system 288 and the two rotate together. The clutch ring 312 is not engaged with the concentric shaft 260.

The third mode of operation is the same as the second, except that the clutch 314 between the input shaft 252 and the concentric shaft 260 is closed so that the IAD 254 is locked. Further, the fork 298 has moved the ring 300 so that it engages both the axle shaft 296 and synchronizer system 288 and the two rotate together. The clutch ring 312 is engaged with the concentric shaft 260.

Figure 5:
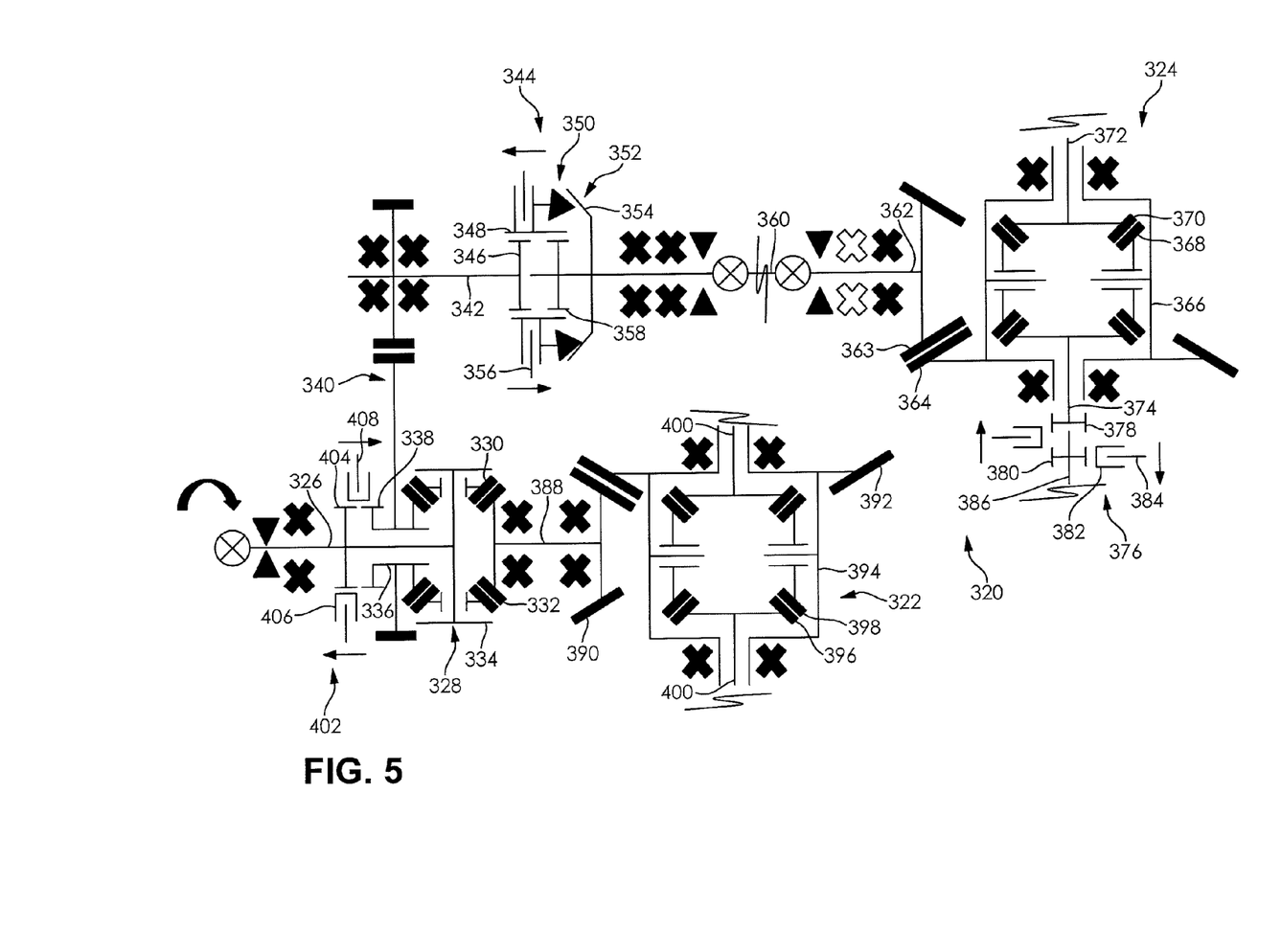
FIG. 5 is a schematic depiction of a fifth embodiment of the tandem axle system.

FIG. 5 depicts another embodiment of a tandem axle system 320. The system 320 comprises a forward axle system 322 and a rear axle system 324. An input shaft 326 is connected to receive rotational energy from a prime mover (not shown). The input shaft 326 rotates an inter-axle differential (IAD) 328. The IAD 328 comprises at least two pinion gears 330 and at least two side gears 332 housed inside a differential carrier 334. The side gears 332 are meshed with the pinion gears 330.

One side gear 332 is connected to a shaft 336 concentric about the input shaft 326. The concentric shaft 336 has a set of teeth, splines or a gear located on an outside surface; the depicted embodiment has a gear 338. In addition, the concentric shaft 336 has a drop gear set 340 connected thereto.

The drop gear set 340 connects the concentric shaft 336 to a synchronizer shaft 342. The synchronizer shaft 342 rotates a synchronizer system 344. A gear 346 is located on the synchronizer shaft 342. A dog clutch ring 348 is mounted on the gear 346 for rotation therewith.

The synchronizer system 344 comprises a cone assembly 350. The cone assembly 350 may be selectively moved in the axial direction into and out of engagement with a plate assembly 352 that is angled to receive the cone assembly 350.

The rotation of the cone assembly 350 is imparted to the plate assembly 352, which causes the plate assembly 352 to rotate. The plate assembly 352 has an angled surface 354 complimentary to the shape of the cone assembly 350. As the cone is brought into additional engagement with the plate, the two begin to rotate at the same rotational rate.

At a predetermined time, such as when the rotational speed of the plate assembly 352 and cone assembly 350 are matched or substantially matched, a shift fork 356 moves the dog clutch ring 348 on the synchronizer shaft gear 346 to a synchronizer gear 358. The dog clutch ring 348 rotationally connects the synchronizer shaft gear 346 and the synchronizer gear 358.

While a synchronizer system 344 is described above, it can be appreciated that dog clutches, friction plate clutches or over-running clutches may be used instead of the synchronizer system 344.

The plate assembly 352 is connected to a propeller shaft 360. The propeller shaft 360 extends to the rear axle system 324. The rear axle system 324 has a pinion shaft 362 rotated by the propeller shaft 360. The pinion shaft 362 rotationally drives a ring gear 364 mounted to a rear differential carrier 366. The rear differential carrier 366 houses at least two pinion gears 368 and at least two side gears 370.

Shafts extend into the differential carrier 366 and connect with the side gears 370. The shafts extend outboard the differential carrier 366. The shafts may be full length shafts or they may be stub shafts. The shafts comprise first and second shafts 372, 374.

A clutch 376, such as a dog-type clutch, may be connected to the second shaft 374. The clutch 376 may comprise a first set of splines or gears 376 that are selectively connected with a second set of splines or gears 380 via a clutch ring 382. The clutch ring 382 selectively connects the gears 378, 380 when moved by a shift fork 384. Thus, the clutch 376 can rotationally connect the stub shaft 374 with an outboard axle 386 that supports at least one wheel and tire (not shown) thereon.

Another side gear 332 is connected to an output shaft 388 of the IAD 328. The output shaft 388 may be a pinion shaft with a pinion gear 390 thereon. The pinion gear 390 is in driving engagement with a ring gear 392. The ring gear 392 is mounted to a differential carrier 394 of the forward axle system 322 and imparts rotation thereto.

The carrier 394 houses at least one side gear 396 and at least one pinion gear 398. The side gear 396 and pinion gear 398 are meshed with one another. Axle shafts 400 are connected to each side gear 396 for rotation therewith.

Another clutch 402, also such as a dog type clutch, may be designed to move axially along the input shaft 326. More specifically, the clutch 402 selectively engages with an input shaft gear 404 and the concentric shaft gear 338. A clutch ring 406 is selectively moved between the gears 404, 338 by a shift fork 408 to connect or disconnect them.

Based on the foregoing, it can be appreciated that the tandem axle system 320 can be operated in different modes.

In the present embodiment, the forward axle system 322 is engaged in the drive-line full time and the rear axle system 324 is engaged for only intermittent use, such as for startup and low speed traction conditions. The rear axle system 324 is disengaged and permitted to remain idle except for exemplary conditions as noted above to improve efficiency and reduce drive-line and churning losses.

The tandem axle system 320 has three modes of operation: first, 6×2 with the rear axle system 324 disconnected; second, 6×4 with the inter-axle differential 328 open with the forward axle and rear axle systems 322, 324 connected; and third, 6×4 with the inter-axle differential locked and the forward and rear axle systems 322, 324 connected.

In the first mode of operation, the synchronizer system 344 is not engaged and no rotational energy is provided to the rear axle system 324. Thus, from the plate assembly 352 rearward is idle; drive-line energy is not used to rotate it and lubricant churning losses are not experienced. Instead, all the rotational energy is provided to the forward axle system 322. The clutch 402 may be engaged. The clutch 376 on the rear axle system is not engaged, thus churning losses from the rear wheels in the rear axle system 324 are prevented or reduced.

In the second mode of operation, the synchronizer system 344 is engaged and rotational energy from the input shaft 326 is provided to both the forward and the rear axle systems 322, 324. The IAD 328 is open and the clutch 376 on the rear axle system 324 is engaged to rotate the axle shaft 386. The clutch 402 is engaged so that the input shaft 326 and the concentric shaft 336 rotate together.

The third mode of operation is the same as the second, except that the clutch 402 between the input shaft 326 and the concentric shaft 336 is closed so that the IAD 328 is locked. The clutch 376 is engaged so that the stub shaft 375 is rotationally connected to the axle shaft.

Figure 6:
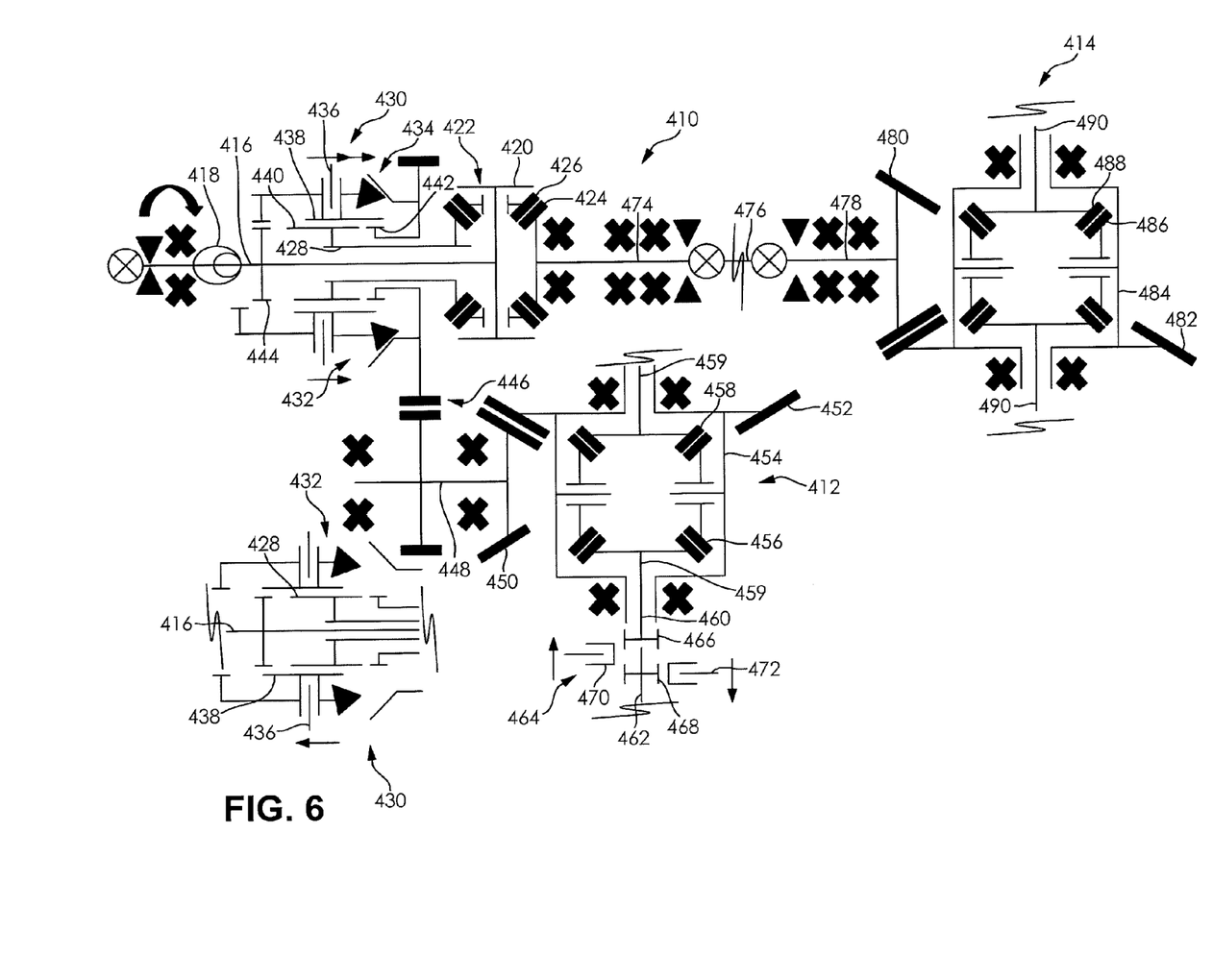
FIG. 6 is a schematic depiction of a sixth embodiment of the tandem axle system.

Turning now to FIG. 6, another embodiment of a tandem axle system 410 is schematically depicted. The system 410 comprises a forward axle system 412 and a rear axle system 414. Rotational energy is provided by an internal combustion engine (not shown) to an input shaft 416. A gerotor pump 418 is driven by the input shaft 416 and is used to pump lubricant to the moving parts of a forward axle system 412. The pump provides lubricant to the forward axle system 412 when the forward axle system 412 is not engaged, or when splash lubricant is not sufficient.

The input shaft 416 extends to an inter-axle differential (IAD) carrier 420 to provide the carrier 420 with rotation. The carrier houses an IAD 422 comprised of at least two side gears 424 and at least two pinion gears 426. The gears 424, 426 are drivingly connected to one another.

A concentric shaft 428 is located about the input shaft 416. The concentric shaft 428 is connected to one of the side gears 424.

The concentric shaft 428 provides rotation to a synchronizer system 430. The synchronizer system 430 comprises a cone assembly 432. The cone assembly 432 may be selectively moved in the axial direction into and out of engagement with a plate assembly 434. Axial movement is imparted to the cone assembly 432 by a shift fork 436 that engages a clutch ring 438.

The cone assembly 432 may be brought into selective engagement with the plate assembly 434. The rotation of the cone assembly 432 is imparted to the plate assembly 434, which causes the plate assembly 434 to rotate. As the cone assembly 432 is brought into additional engagement with the plate assembly 434, the plate assembly 434 is brought up to the same rotation as the cone assembly 432.

At a predetermined time, such as when the rotational speed of the plate assembly 434 and cone assembly 432 are matched or substantially matched, the clutch ring 438 engages gears 440, 442 so that they are locked together.

While a synchronization system 430 is described above, dog clutches, friction plate clutches or over-running clutches may be used instead of the synchronizer system 430.

The plate assembly 434 is connected to a set of drop gears 446. The drop gears 446 connect with a pinion shaft 448 for the forward axle system 412. The pinion shaft 448 has pinion gear 450 meshed with a ring gear 452. The ring gear 452 is mounted to a differential carrier 454 to impart rotation to the carrier 454. The differential carrier 454 houses at least two pinion gears 456 and at least two side gears 458.

Axle shafts are connected to the side gears 458. The shafts, which may be stub shafts, extend from the differential carrier 454.

One stub shaft 460 is selectively connected to an adjacent shaft 462 by a clutch 464, such as a dog clutch. The clutch 464 may comprise a first set of splines, or gear 466, that are selectively connected with a second set of splines or a gear 468 via a clutch ring 470. The clutch ring 470 selectively connects the gears 466, 468 when moved by a shift fork 472. Thus, the clutch 464 can rotationally connect the stub shaft 460 with the axle 462 that supports at least one wheel and tire (not shown) thereon.

The other IAD side gear is 424 connected to an output shaft 474. The output shaft 474 is connected to a propeller shaft 476. The propeller shaft 476 spans between the IAD 422 and the rear axle system 414.

The rear axle system 414 comprises a pinion shaft 478 with a pinion gear 480 thereon. The pinion gear 480 is meshed with a ring gear 482 attached to a differential carrier 484. The differential carrier 484 houses at least two pinion gears 486 and at least two side gears 488. Axle shafts 490 are connected to the side gears 488 for rotation therewith. Wheels and associated tires (not shown) are connected to the axle shafts 490 outboard of the side gears 488.

Based on the foregoing, it can be appreciated that the tandem axle system 410 can be operated in different modes.

In the present embodiment, the rear axle system 414 is engaged in the drive-line full time and the forward axle system 412 is engaged for only intermittent use, such as for startup and low speed traction conditions. The front axle system 412 is disengaged and allowed to idle most of the time to increase driveline efficiency and to reduce or prevent lubricant churning losses.

The tandem axle system 410 has three modes of operation: first, 6×2 with the forward axle system 412 disconnected; second, 6×4 with the inter-axle differential open 422 with the forward and rear axle systems 412, 414 connected; and third, 6×4 with the inter-axle differential 422 locked and the forward and the rear axle systems 412, 414 connected.

In the first mode of operation, the synchronizer system 430 is not engaged and no rotational energy is provided to the forward axle system 412. Instead, all the rotational energy is provided to the rear axle system 414. The clutch on the forward axle system 412 is open thus the forward axle system 412 is provided with no rotation to reduce or prevent lubricant churning losses in the forward axle system 412. The clutch 430 is engaged so that the input shaft 416 is rotationally connected to the concentric shaft 428.

In the second mode of operation, the synchronizer system 430 is engaged and rotational energy from the input shaft 416 is provided to both the front and the rear axle systems 412, 414. The IAD 422 is open and the clutch on the forward axle system 412 is engaged. The clutch ring 438 is moved to unlock the input shaft 416 from the concentric shaft 428.

The third mode of operation is the same as the second, except that the synchronizer system 430 is engaged between the IAD 422 and the input shaft 416, thus locking the IAD 422. The clutch ring 438 is moved to lock the input shaft 416 to the concentric shaft 428.

Figures 7A, 7B:
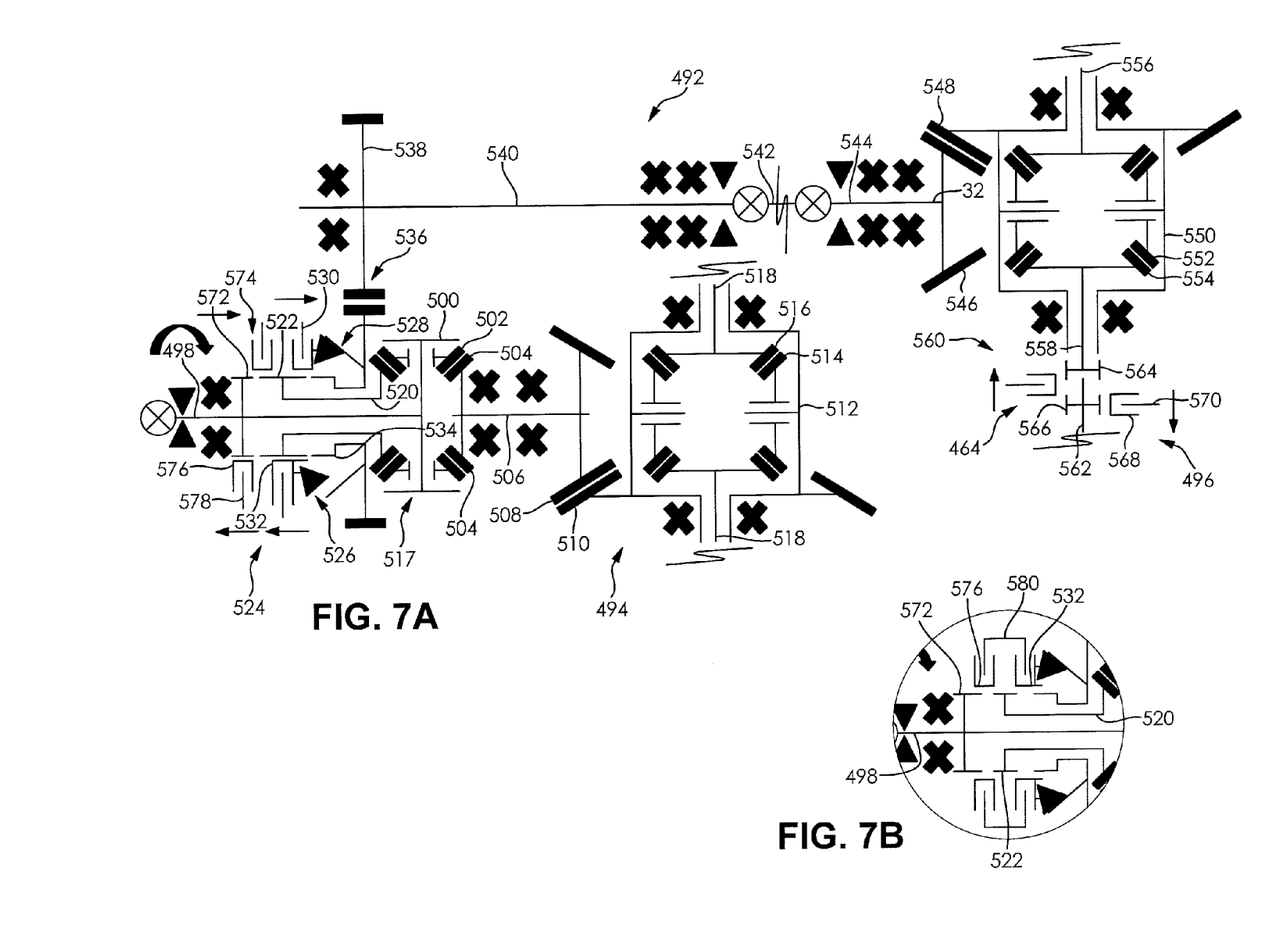
FIG. 7A is a schematic depiction of a seventh embodiment of the tandem axle system.
FIG. 7B is a partial view of the tandem axle system depicted in FIG. 7A but with a modification to two shift mechanisms.

Turning now to FIG. 7A, yet another embodiment of a tandem axle system 492 is depicted. The system 492 comprises a forward axle system 494 and a rear axle system 496. An input shaft 498 is connected to receive rotational energy from a prime mover (not shown). The input shaft 498 rotates a differential carrier 500. At least two differential pinion gears 502 and at least two side gears 504 are meshed with one another and are housed within the differential carrier 500. The carrier 500, the differential pinion gears 502 and side gears 504 comprise an inter-axle differential 517.

One side gear 504 is connected to a pinion shaft 506. The pinion shaft 506 has a pinion gear 508 thereon. The pinion gear 508 is meshed with a ring gear 510 on the forward axle system 494. The ring gear 510 is connected to a forward differential carrier 512. The carrier 512 houses at least one differential pinion gear 514 and at least one side gear 516. The pinion gear 514 and side gear 516 are meshed with one another. In the depicted embodiment, there are two side gears 516.

Each side gear 516 is drivingly connected to an axle shaft 518. The axle shafts 518 support wheels and tires (not shown) thereon.

A concentric shaft 520 is located about the input shaft 498. The concentric shaft 520 is connected to one of the side gears 504. A gear 522, or splines, is provided on the shaft 520 opposite the connection with the side gear 504.

The concentric shaft 520 provides rotation to a synchronizer system 524. The synchronizer system 524 comprises a cone assembly 526. The cone assembly 526 may be selectively moved in the axial direction into and out of engagement with a plate assembly 528. Axial movement is imparted to the cone assembly 526 by a shift fork 530 that engages a clutch ring 532.

The cone assembly 526 may be brought into selective engagement with the plate assembly 528. The rotation of the cone assembly 526 is imparted to the plate assembly 528, which causes the plate assembly 528 to rotate. As the cone assembly 526 is brought into additional engagement with the plate assembly 528, the plate assembly 528 is brought up to the same rotation as the cone assembly 526.

At a predetermined time, such as when the rotational speed of the plate assembly 528 and cone assembly 526 are matched or substantially matched, the clutch ring 532 engages the concentric shaft gear 522 and a gear 534 on the plate assembly 528 so that they are locked together.

While a synchronization system 524 is described above, dog clutches, friction plate clutches or over-running clutches may be used instead of the synchronizer system 524.

The plate assembly 528 is connected to a drop gear assembly 536. The assembly 536 comprises a gear 538 on an output shaft 540. The rotation of the drop gear assembly 536 rotates the output shaft gear 538. The output shaft gear 538 is rotationally connected to a propeller shaft 542. The propeller shaft 542 is rotationally connected to a rear pinion shaft 544.

The rear pinion shaft 544 has a pinion gear 546 meshed with a rear differential ring gear 548. The ring gear 548 is mounted on a differential carrier 550. The carrier 550 houses at least two pinion gears 552, connected to the carrier 550, and two side gears 554 meshed with the pinion gears 552.

Shafts extend into the differential carrier 550 and connect with the side gears 554. The shafts extend outboard the differential carrier 550. The shafts may be full length shafts or they may be stub shafts. First and second stub shafts 556, 558 are shown extending from the carrier 550.

A clutch 560, such as a dog-type clutch, may be located on the second stub shaft 558. The clutch 560 may selectively move along the stub shaft 558 for connecting and disconnecting the stub shaft 558 with an axle shaft 562 rotationally supporting at least one wheel and tire (not shown).

The clutch 560 may comprise a first set of splines 564, or a gear, that are selectively connected with a second set of splines 566, or a gear, via a clutch ring 568. The clutch ring 568 selectively connects the splines 564, 566 when moved by a shift fork 570.

The input shaft 498 has a gear 572 mounted thereon adjacent the concentric shaft gear 522. A clutch 574, such as a dog-type clutch, is provided to selectively connect the input shaft gear 572 and the concentric shaft gear 522.

The clutch 574 comprises a clutch ring 576 with internal teeth or splines. A shift fork 578 selectively moves the clutch ring 576 from the input shaft gear 572 alone to the input shaft gear 522 and the concentric shaft gear to rotationally connect them together.

Turning now to FIG. 7B, it can be appreciated that shift forks 578 and 530 can be combined into a single shift mechanism 580. The single shift mechanism 580 comprises shift collars 532 and 576 moved in concert with one another. The movement of the collars 532, 576 can be by a single shift fork that is connected to both collars 532, 576, or it can be by two shift forks that are connected together, as shown in the figure.

The tandem axle system 492 has three modes of operation: first, 6×2 with the rear axle system 496 disconnected; second, 6×4 with the inter-axle differential 517 open with the forward and rear axle systems 494, 496 connected; and third, 6×4 with the inter-axle differential 517 locked and the forward and the rear axle systems 494, 496 connected.

In the first mode of operation, the synchronizer system 524 is not engaged and no rotational energy is provided to the rear axle system 496. Instead, all the rotational energy is provided to the forward axle system 494. The clutch 560 on the rear axle system 496 is open thus the forward axle system 494 is provided with no rotation to reduce or prevent lubricant churning losses in the rear axle system 496. The shift collar 576 does not connect the input shaft 498 to the concentric shaft 520.

In the second mode of operation, the synchronizer system 524 is engaged and rotational energy from the input shaft 498 is provided to both the forward and the rear axle systems 494, 496. The IAD 517 is open and the clutch 560 on the rear axle system 496 is engaged. The clutch ring 568 is engaged with the stub shaft 558 and the axle shaft 562 so that they rotate together. The shift collar 576 is moved so that the input shaft 498 is not connected with the concentric shaft 520.

The third mode of operation is the same as the second mode of operation and the clutch 574 between the input shaft 498 and the concentric shaft 570 is closed.

What is claimed is:

1. A method of driving a tandem axle system, comprising:
providing rotation to an input shaft for said tandem axle system, said input shaft rotation being continuously transmitted to a rear axle system of said tandem axle system and being selectively provided to a forward axle system of said tandem axle system,
said input shaft driving an inter-axle differential having differential pinion gears and first and second side gears, wherein said first side gear is connected to a shaft concentric with said input shaft, and said second side gear drives a rear pinion gear that provides rotation to said rear axle system comprising a rear differential and rear axles connected to said rear differential,
wherein said concentric shaft drives a cone assembly of a synchronizer system, said cone assembly is selectively engagable with a plate assembly of said synchronizer system to rotate said plate assembly,
wherein said plate assembly rotationally drives a forward pinion gear for providing rotation to said forward axle system comprising a forward differential, said forward differential driving at least one stub shaft selectively connected to an axle shaft by a forward axle system clutch.

2. The method of claim 1, wherein said cone assembly is selectively moved into engagement with said plate assembly by a first shift fork moving a first clutch ring slidable on a first gear on said concentric shaft to said plate assembly.

3. The method of claim 1, wherein a second shift fork selectively moves, a second clutch ring from a second concentric shaft gear into engagement with a differential carrier of said inter axle differential to lock said differential carrier to said concentric shaft.

4. The method of claim 3, wherein a third shift fork selectively moves a third clutch ring to connect said stub shaft and said axle shaft so that they rotate together.

5. The method of claim 1, wherein said plate assembly is drivingly engaged with a drop gear set to drive said forward pinion gear.

6. The method of claim 1, wherein in a first operation mode of said tandem axle system, said cone assembly is not engaged with said plate assembly, and said forward axle system clutch is open and a differential carrier and said concentric shaft are locked and a third shift fork selectively moves a third clutch ring to disconnect said stub shaft and said axle shaft so that they do not rotate together.

7. The method of claim 1, wherein in a second mode of operation of said tandem axle system, said cone assembly is engaged with said plate assembly and a differential carrier is not locked to said concentric shaft with an interaxle differential clutch and a third shift fork selectively moves a third clutch ring to connect said stub shaft and said axle shaft so that they rotate together.

8. The method of claim 1, wherein in a third mode of operation of said tandem axle system, said cone assembly is engaged with said plate assembly and a differential carrier is locked to said concentric shaft with an interaxle differential clutch and a third shift fork selectively moves a third clutch ring to connect said stub shaft and said axle shaft so that they rotate together.

9. A method of driving a tandem axle system, comprising:
providing rotation to an input shaft for said tandem axle system, said input shaft rotation being continuously transmitted to a forward axle system of said tandem axle system and being selectively provided to a rear axle system of said tandem axle system, said input shaft driving an inter-axle differential having differential pinion gears and first and second side gears, wherein said first side gear is connected to a shaft concentric with said input shaft, and said second side gear providing rotational input to a synchronizer system, wherein said concentric shaft has a drop gear set mounted for rotation thereon, said drop gear set driving a forward pinion gear connected to a forward differential of said forward axle system, wherein forward axles are connected to said forward differential for rotation therewith, wherein said synchronizer system comprises a cone assembly selectively engageable with a plate assembly to rotate said plate assembly, wherein said plate assembly provides rotation to a rear differential of said rear axle system, said rear differential driving at least one stub shaft selectively connected to an axle shaft by a rear axle system clutch.

10. The method of claim 9, wherein a first shift fork selectively moves a first clutch ring to connect an input shaft gear with a concentric shaft gear so that they rotate together.

11. The method of claim 9, wherein a second shift fork selectively moves a second clutch ring to connect an inter-axle differential output shaft with said cone assembly so that they rotate together.

12. The method of claim 9, wherein a third shift fork selectively moves a third clutch ring to connect said stub shaft and said axle shaft so that they rotate together.

13. The method of claim 10, wherein in a first mode of operation of said tandem axle system, said cone assembly is not engaged with said plate assembly so rotation is only provided to said forward axle system, said first clutch ring connects an input shaft gear with a concentric shaft gear so that they rotate together and a third shift fork selectively moves a third clutch ring to disconnect said stub shaft and said axle shaft so that they do not rotate together.

14. The method of claim 9, wherein in a second mode of operation of said tandem axle system, said cone assembly is engaged with said plate assembly to transfer rotation to said rear axle system and said first clutch ring does not connect said input shaft gear with said concentric shaft gear and a third shift fork selectively moves a third clutch ring to connect said stub shaft and said axle shaft so that they rotate together.

15. The method of claim 9, wherein in a third mode of operation of said tandem axle system, said cone assembly is engaged with said plate assembly to transfer rotation to said rear axle system and said first clutch ring connects said input shaft gear with said concentric shaft gear so that they rotate together and a third shift fork selectively moves a third clutch ring to connect said stub shaft and said axle shaft so that they rotate together.

16. A method for driving a tandem axle system, comprising:

providing rotation to an input shaft for said tandem axle system, said input shaft rotation being continuously transmitted to a forward axle system of said tandem axle system and being selectively provided to a rear axle system of said tandem axle system, wherein said input shaft rotationally drives a differential carrier of an inter-axle differential, said differential carrier housing a differential pinion and a first and a second side gear, wherein said first side gear drives an output shaft and said second side gear provides rotational input to a shaft concentric with said output shaft, wherein said concentric shaft drives a pinion shaft for a forward differential of said forward axle system, wherein forward axles are connected to said forward differential for rotation therewith, wherein said output shaft drives a synchronizer system comprising a cone assembly selectively engageable with a plate assembly to rotate said plate assembly, wherein said plate assembly provides rotation to a rear differential of said rear axle system, said rear differential driving at least one stub shaft selectively connected to an axle shaft by a rear axle system clutch.

17. The method of claim 16, wherein a first shift fork selectively moves a first clutch ring between said differential carrier and said concentric shaft so that they rotate together.

18. The method of claim 16, wherein a second shift fork selectively moves a second clutch ring between said output shaft and said plate assembly so that they rotate together.

19. The method of claim 16, wherein a third shift fork of said rear axle system clutch selectively moves a third clutch ring between said stub shaft and said axle shaft so that they rotate together.

20. The method of claim 16, wherein in a first mode of operation of said tandem axle system, said synchronizer system is open, said rear axle system clutch is open and rotation is provided only to said forward axle system and a first clutch ring has engaged said differential carrier and said concentric shaft so that they rotate together and a third shift fork selectively moves a third clutch ring to disconnect said stub shaft and said axle shaft so that they do not rotate together.

21. The method of claim 16, wherein in a second mode of operation of said tandem axle system, said synchronizer system is closed and a first clutch ring has not engaged said differential carrier and said concentric shaft so that they do not rotate together and a third shift fork selectively moves a third clutch ring to connect said stub shaft and said axle shaft so that they rotate together.

22. The method of claim 16, wherein in a third mode of operation of said tandem axle system, said synchronizer system is closed and said first clutch ring engages both said differential carrier and said concentric shaft so that they rotate together and a third shift fork selectively moves a third clutch ring to connect said stub shaft and said axle shaft so that they rotate together.

23. A method for driving a tandem axle system, comprising:

providing rotation to an input shaft for said tandem axle system, said input shaft rotation being continuously transmitted to a forward axle system of said tandem axle system and being selectively provided to a rear axle system of said tandem axle system, wherein said input shaft rotationally drives an inter-axle differential comprising a differential pinion and a first and a second side gear, wherein said first side gear drives a shaft concentric with said input shaft and said second side gear drives an inter-axle differential output shaft, wherein said concentric shaft drives a pinion shaft for a forward differential of said forward axle system, wherein forward axles are connected to said forward differential for rotation therewith, wherein said inter-axle differential output shaft drives a rear differential pinion shaft, said rear differential pinion shaft providing rotation to a rear differential housing a differential pinion gear and two side gears, wherein one of said side gears drives a stub shaft connected to a plate assembly of a synchronizer system, said synchronizer system also comprising a cone assembly selectively engageable with said plate assembly.

24. The method of claim 23, wherein a first shift fork selectively moves a first clutch ring to engage both an input shaft gear and said concentric shaft so that they rotate together.

25. The method of claim 22, wherein a second shift fork selectively moves a second clutch ring to engage both said inter-axle differential output shaft and said rear differential pinion shaft so that they rotate together.

26. The method of claim 22, wherein a third shift fork selectively moves a third clutch ring engage said cone assembly with said plate assembly so that they rotate together.

27. The method of claim 23, wherein in a first mode of operation of said tandem axle system, a first clutch ring is engaged with said concentric shaft and said synchronizer system is open and rotation is only provided to said forward axle system and a second shift fork selectively moves a second clutch ring to disconnect said output shaft and said pinion shaft so that they do not rotate together.

28. The method of claim 23, wherein in a second mode of operation of said tandem axle system, a first clutch ring is not engaged with said concentric shaft, a second clutch ring engages both the inter-axle differential output shaft and a propeller shaft to provide drive to the rear tandem axle system and a third shift fork selectively moves a third clutch ring to connect said stub shaft and said axle shaft so that they rotate together.

29. The method of claim 23, wherein in a third mode of operation of said tandem axle system, a first clutch ring is engaged with said concentric shaft, a second clutch ring engages both the inter-axle differential output shaft and a propeller shaft to provide drive to the rear axle system and a third shift fork selectively moves a third clutch ring to connect said stub shaft and said axle shaft so that they rotate together.

30. A method for driving a tandem axle system, comprising:
providing rotation to an input shaft for said tandem axle system, said input shaft rotation being continuously transmitted to a forward axle system of said tandem axle system and being selectively provided to a rear axle system of said tandem axle system,
wherein said input shaft rotationally drives an inter-axle differential, said inter-axle differential comprising a differential pinion and a first and a second side gear,
wherein said first side gear drives a shaft concentric with said input shaft and said second side gear drives an input pinion gear for a forward differential,
wherein said concentric shaft drives a synchronizer shaft for a synchronizer system comprising a plate assembly and a cone assembly connected to said synchronizer shaft, said cone assembly is selectively engageable with said plate assembly,
wherein said plate assembly provides rotation to a rear differential pinion shaft, said rear differential pinion shaft providing rotation to a rear differential housing a differential pinion gear and two side gears.

31. The method of claim 30, wherein a stub shaft is connected to one of said rear differential side gears for rotation therewith, said stub shaft having a gear thereon, and a first shift fork selectively moves a first clutch ring to engage both said stub shaft gear and an axle so that they rotate together.

32. The method of claim 30, wherein a second shift fork selectively moves a second clutch ring to engage both an input shaft gear and said concentric shaft so that they rotate together.

33. The method of claim 30, wherein a third shift fork selectively moves a third clutch ring to engage both said synchronizer shaft and said plate assembly so that they rotate together.

34. The method of claim 30, wherein in a first mode of operation of the tandem axle system, a second clutch ring is engaged with the input shaft gear and said concentric shaft, said synchronizer system is open and said first clutch ring is not engaged with said stub shaft gear and said axle.

35. The method of claim 30, wherein in a second mode of operation of the tandem axle system, a third clutch ring engages said synchronizer shaft and said plate assembly and a first clutch ring engages the stub shaft gear and said axle and a second shift fork selectively moves a second clutch ring to disconnect said input shaft and said concentric shaft so that they do not rotate together.

36. The method of claim 30, wherein in a third mode of operation of the tandem axle system, a third clutch ring engages said synchronizer shaft and said plate assembly, a first clutch ring engages said stub shaft gear and said axle and a second clutch ring engages both said input shaft gear and said concentric shaft.

37. A method for driving a tandem axle system, comprising:
providing rotation to an input shaft for said tandem axle system, said input shaft rotation being continuously transmitted to a rear axle system of said tandem axle system and being selectively provided to a forward axle system of said tandem axle system,
wherein said input shaft rotationally drives an inter-axle differential, said inter-axle differential comprising a differential pinion and a first and a second side gear,
wherein said first side gear drives a shaft concentric with said input shaft and said second side gear drives an input pinion gear for a rear differential of said rear axle system,
wherein said concentric shaft drives a cone assembly of a synchronizer system, said synchronizer system also comprising a plate assembly,
wherein said plate assembly is connected to an input pinion gear of said forward axle system, said forward axle system also comprising a differential having a pair of side gears and differential pinion gears.

38. The method of claim 37, wherein a stub shaft is connected to one of said forward differential side gears for rotation therewith, said stub shaft having a gear thereon, and a first shift fork selectively moves a first clutch ring to engage both said stub shaft gear and an axle so that they rotate together.

39. The method of claim 37, wherein a second shift fork selectively moves a second clutch ring into engagement with a concentric shaft gear, said plate assembly and an input shaft gear and selectively moves said synchronizer system into engagement.

40. The method of claim 37, wherein in a first mode of operation of said tandem axle system, said synchronizer system is not engaged and a first clutch ring is not engaged with a stub shaft gear and an axle and a second shift fork selectively moves a second shift clutch ring to lock the input shaft to the concentric shaft.

41. The method of claim 37, wherein in a second mode of operation of said tandem axle system, said cone assembly is engaged with said plate assembly so that both assemblies are rotating together and a first clutch ring is engaged with both said stub shaft gear and an axle and a second shift fork selectively moves a second shift clutch ring to unlock the input shaft with respect to the concentric shaft.

42. The method of claim 37, wherein in a third mode of operation of said tandem axle system, said cone assembly is engaged with said plate assembly so that both assemblies are rotating together and a first clutch ring is engaged with both a stub shaft gear and an axle and the inter-axle differential is locked and a second shift fork selectively moves a second shift clutch ring to lock the input shaft to the concentric shaft.

43. A method for driving a tandem axle system, comprising:
providing rotation to an input shaft for said tandem axle system, said input shaft rotation being continuously transmitted to a forward axle system of said tandem axle system and being selectively provided to a rear axle system of said tandem axle system,
wherein said input shaft rotationally drives an inter-axle differential, said inter-axle differential comprising a differential pinion and a first and a second side gear,
wherein said first side gear drives a shaft concentric with said input shaft and said second side gear drives an input pinion gear for a forward differential of said forward axle system,
wherein said concentric shaft drives a cone assembly of a synchronizer system, said synchronizer system also comprising a plate assembly,
wherein said plate assembly is connected to an input pinion gear of said rear axle system, said rear axle system also comprising a differential having a pair of side gears and differential pinion gears.

44. The method of claim 43, wherein a stub shaft is connected to one of said rear differential side gears for rotation therewith, said stub shaft having a gear thereon, and a first shift fork selectively moves a first clutch ring to engage both said stub shaft gear and an axle so that they rotate together.

45. The method of claim 41, wherein a second shift fork selectively moves a second clutch ring into engagement with a concentric shaft gear and an input shaft gear so that they rotate together.

46. The method of claim 43, wherein a third shift fork selectively moves a third clutch ring into engagement with said concentric shaft gear and said plate assembly so that they rotate together.

47. The method of claim 43, wherein in a first mode of operation of said tandem axle system, said synchronizer system is not engaged and a first clutch ring is not engaged with a stub shaft gear and an axle and a second shift fork selectively moves a second clutch ring to connect said concentric shaft and said input shaft so that they rotate together.

48. The method of claim 43, wherein in a second mode of operation of said tandem axle system, said cone assembly is engaged with said plate assembly so that both assemblies are rotating together and a first clutch ring is engaged with both a stub shaft gear and an axle so that they rotate together and a second shift fork selectively moves a second clutch ring to disconnect said input shaft and said concentric shaft so that they do not rotate together.

49. The method of claim 43, wherein in a third mode of operation of said tandem axle system, said cone assembly is engaged with said plate assembly so that both assemblies are rotating together and a first clutch ring is engaged with both a stub shaft gear and an axle so that they rotate together and the inter-axle differential is locked and a second shift fork selectively moves a second clutch ring to connect said input shaft and said concentric shaft so that they rotate together.

50. The method of 43, wherein a second clutch ring and third clutch ring are connected to a single shift mechanism for moving said clutch rings in concert with one another, wherein said single shift mechanism selectively moves said second clutch ring into engagement with a concentric shaft gear and an input shaft gear so that they rotate together and said single shift mechanism selectively moves said third clutch ring into engagement with said concentric shaft gear and said plate assembly so that they rotate together.

* * * * *